April 17, 1962  E. L. ADAMS ET AL  3,029,471
METHOD AND APPARATUS FOR MAKING PLASTIC ARTICLES
Filed Oct. 14, 1959  5 Sheets-Sheet 1
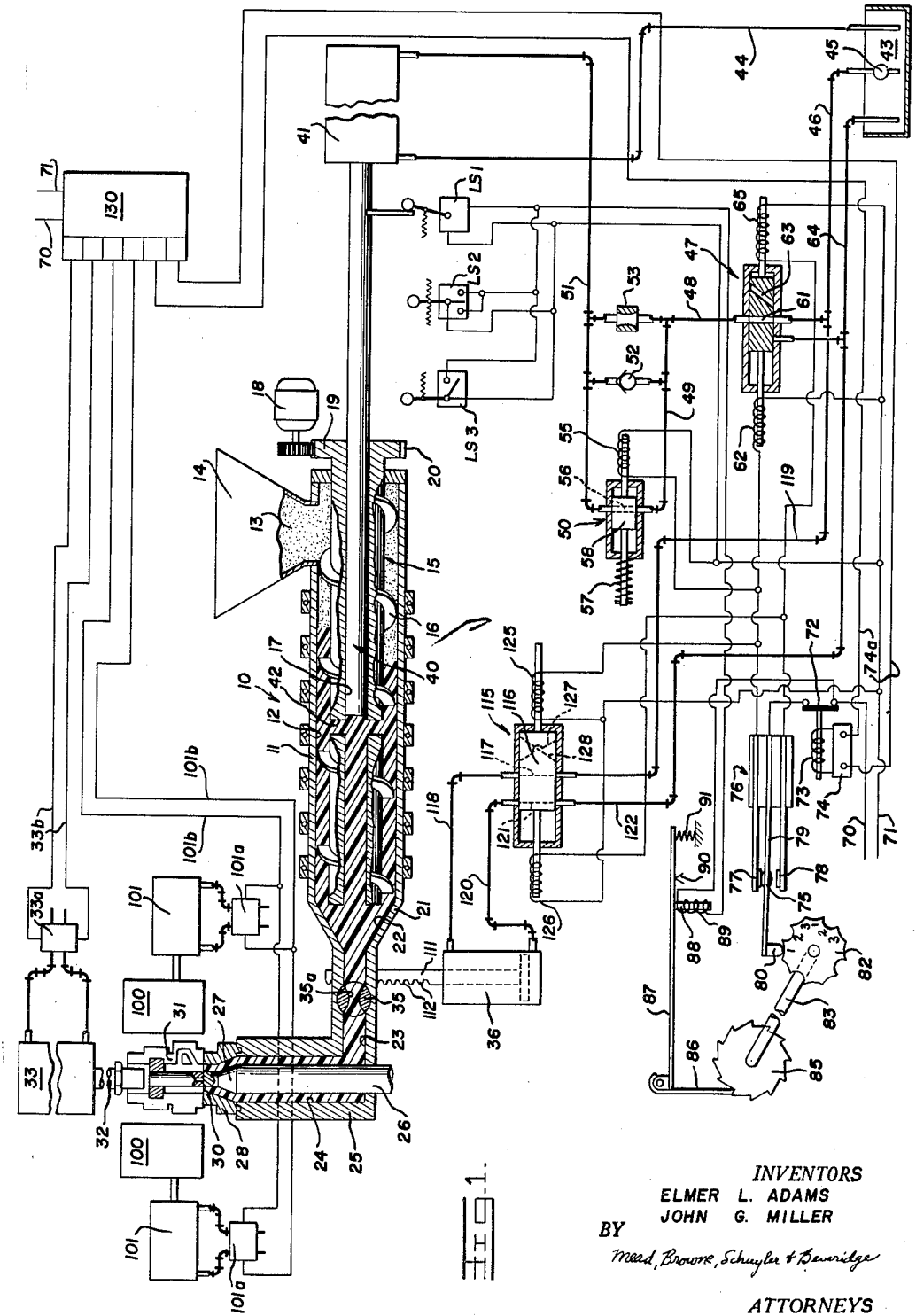
INVENTORS
ELMER L. ADAMS
JOHN G. MILLER
BY
Mead, Browne, Schuyler & Beveridge
ATTORNEYS

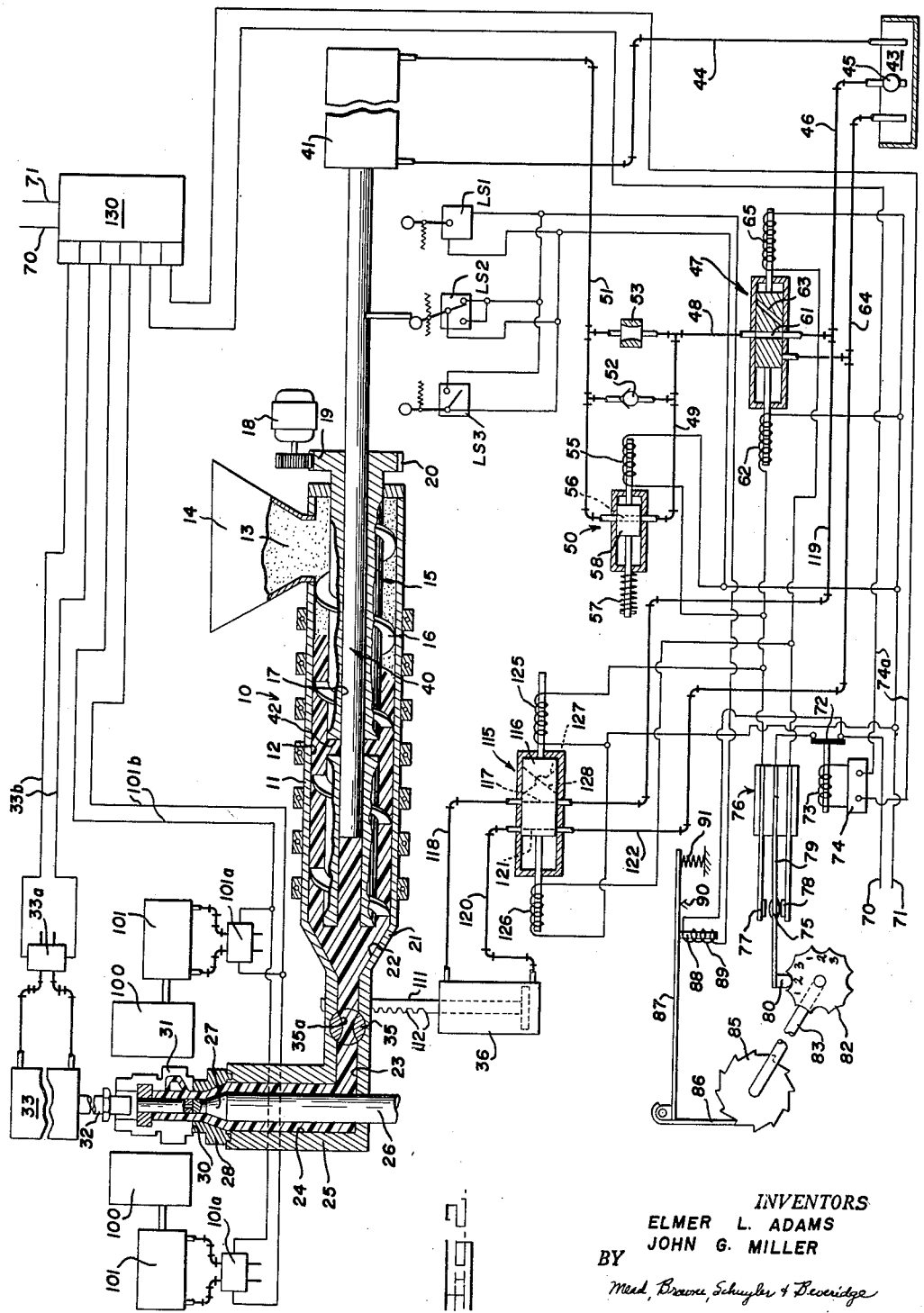

April 17, 1962 E. L. ADAMS ET AL 3,029,471
METHOD AND APPARATUS FOR MAKING PLASTIC ARTICLES
Filed Oct. 14, 1959 5 Sheets-Sheet 3
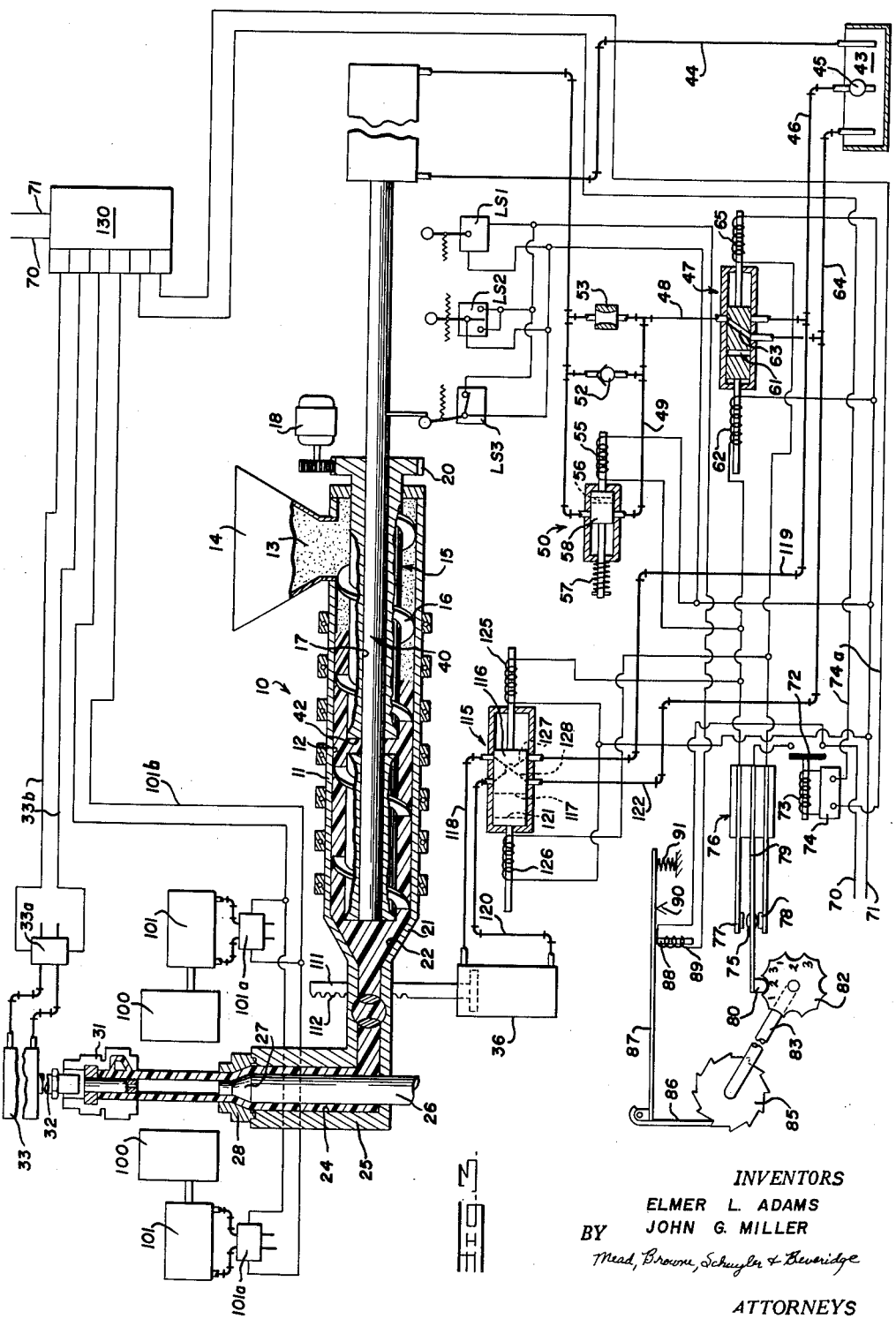
INVENTORS
ELMER L. ADAMS
JOHN G. MILLER
BY
Mead, Browne, Schuyler & Beveridge
ATTORNEYS

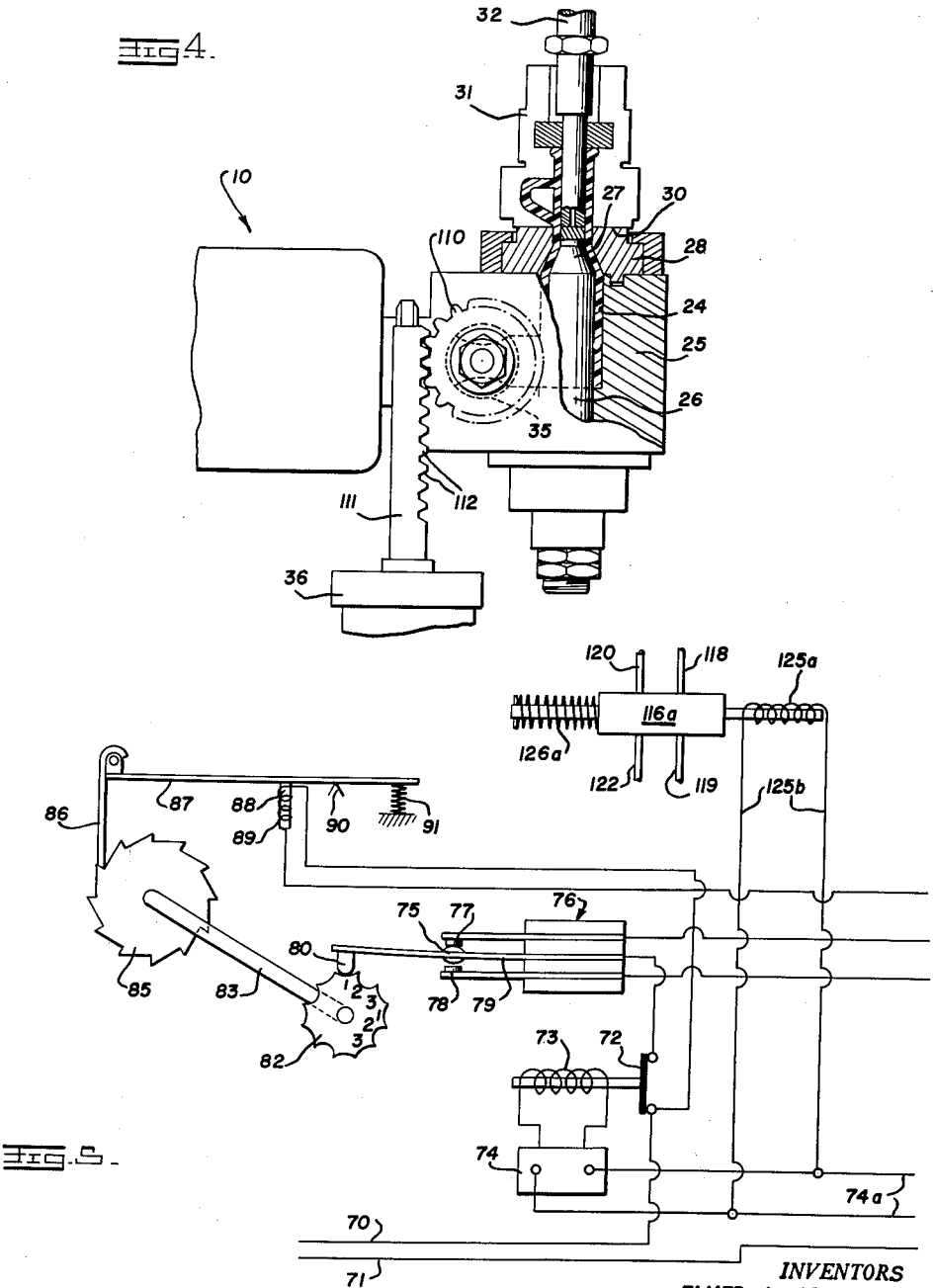

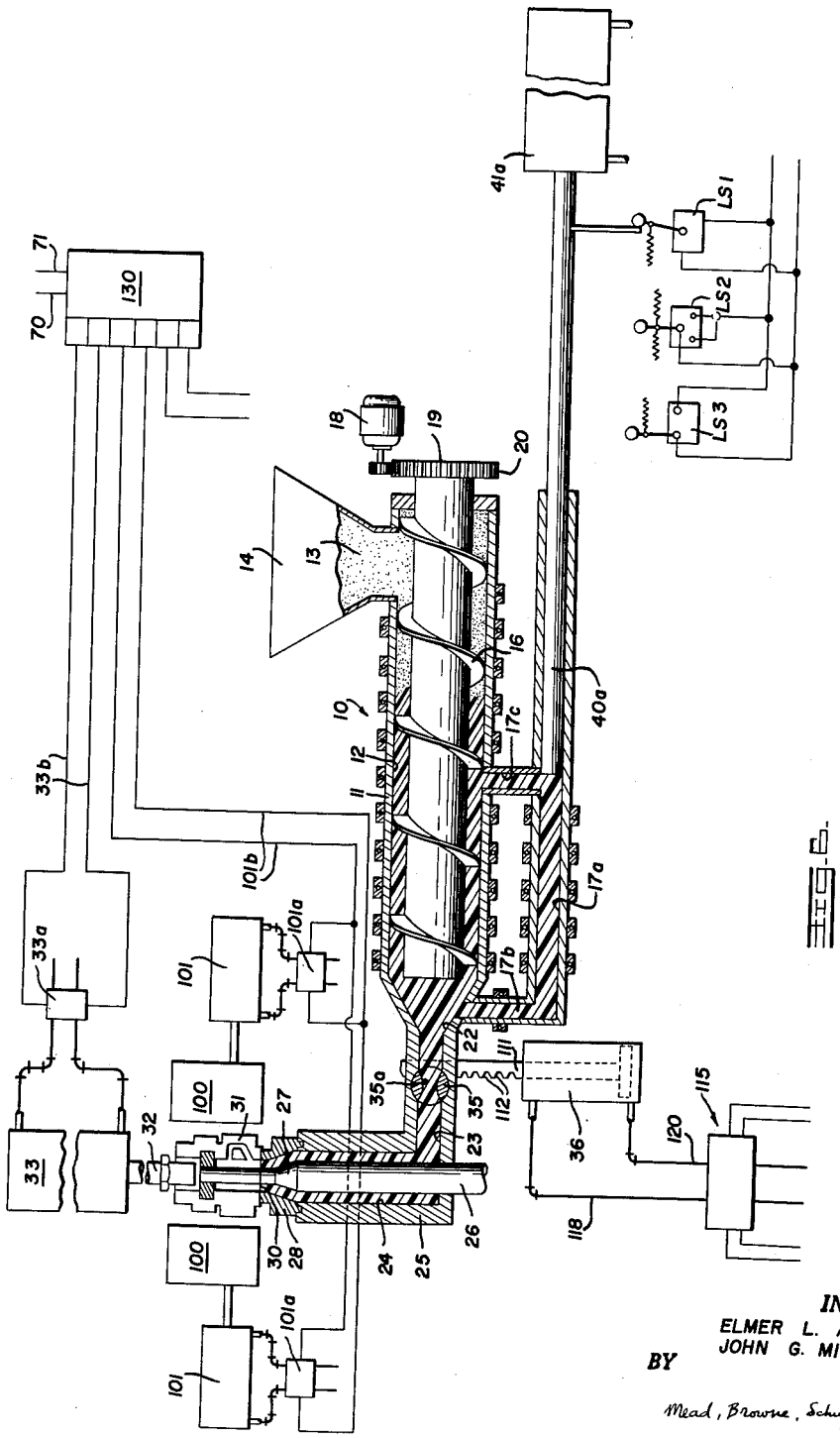

United States Patent Office 3,029,471
Patented Apr. 17, 1962

3,029,471
METHOD AND APPARATUS FOR MAKING PLASTIC ARTICLES
Elmer L. Adams and John G. Miller, Toledo, Ohio, assignors to Owens-Illinois Glass Company, a corporation of Ohio
Filed Oct. 14, 1959, Ser. No. 847,041
9 Claims. (Cl. 18—30)

The present invention relates to an apparatus and a method for making plastic articles and more particularly to a method and apparatus for making a plastic article by either injection molding or extrusion operations, or by combined injection molding, extrusion and blowing operations.

In the manufacture of plastic articles, particularly containers, it has ben proposed that a finished portion of the article be formed by injection molding, that a tubular extension be extruded integral with the finished portion, and that the extension then be blown to final shape after enclosure in a blow mold. The making of articles by such a combined process has been disclosed and claimed in Patent No. 2,804,654, owned by the assignee of the present invention.

The present invention now provides an improved apparatus capable of carrying out any desired forming operation, whether injection molding or extrusion. To illustrate the wide utility of the present method and apparatus, the instant invention is described in detail as applied to the above described combined process, but it will be understood that the uses of the apparatus are not limited to such a process.

As adapted to such a combined process, the apparatus herein proposed utilizes an extruder for plasticizing plastic material, preferably thermoplastic in nature, and for supplying such material to an extrusion orifice under pressure. At the orifice, material plasticized and supplied by the extruder is initially injection molded into a finish or neck mold directly overlying the orifice. Next, the neck mold is moved away from the orifice and an integral tubular extension is extruded through the orifice. After an extension of the proper length has been formed, the extrusion operation is halted, the extension is enclosed within a blow mold, and the extension is blown to its final configuration.

A primary object of this invention is the utilization of a single power-actuated piston to supplement the extruder output pressure during both the injection and the extrusion operations, this piston also controlling recirculation of plasticized material in the extruder during those periods at which the extruder output is not utilized.

Another object of this invention resides in the utilization of a continuously operating extruder functioning primarily as a source of plasticized material under pressure and a power-actuated piston supplementing the extruder and utilized as the primary pressure source during those intermittent periods of operation during which actual forming operations are carried out. Such forming operations may be either injection molding or extrusion or combination injection-extrusion operations.

It is a further object of this invention to provide an apparatus in which a plasticizer-extruder having a pressure-generating screw is provided with an axial bore in which a piston is disposed for axial displacement to control the extruder output of plasticized material. When the piston is positioned to accommodate recirculation of the extruder output, the extruder operates against only a predetermined back-pressure. If the resistance to extruder output (e.g., the resistance of a shut-off valve or the resistance of a restricted orifice) is greater than the back-pressure resistance, the extruder output is recirculated and no effective extruder output occurs. If the resistance to extruder output is less than the back-pressure necessary to recirculation, extruder output occurs.

Yet another object is the provision of a single power actuated piston to control intermittent operation of an axially fixed, power driven plasticizer-extruder screw and to supplement the plasticizer-extruder screw output of plastic material and at a pressure different from the normal plasticizer-extruder screw pressure.

In the preferred embodiment of the invention, the piston is operable to supplement extruder output whenever effective extruder output is obtained and the piston is also operated by the back-pressure during non-effective extruder operation periods to control recirculation.

Still another object is the provision of a method of performing intermittent forming operations with plasticized material supplied by a continuously operable plasticizer-extruder connected with a material-dispensing orifice only during the intermittent operations, the plasticizer-extruder output being supplemented during forming operations and the plasticizer-extruder output being recirculated in the interval between such forming operations.

It is an additional object of this invention to provide a method whereby a plasticizer-extruder continuously operates to provide plasticized plastic-material for intermittent dispensing through an output orifice. Intermediate the dispensing periods, excess output of plasticized material is accumulated and the accumulated material is recycled through the plasticizer-extruder to avoid the buildup of excessive output pressures and to maintain the accumulated material for use. Thus, the capacity of the plasticizer-extruder can be less than the instantaneous demand for plasticized material during the forming operation.

On the drawings—
FIGURE 1 is a diagrammatic representation of an apparatus and control mechanism of the present invention illustrated in an at-rest position immediately prior to operation;

FIGURE 2 is a view similar to FIGURE 1 illustrating the apparatus of the present invention in an operated position;

FIGURE 3 is a view similar to FIGURES 1 and 2 illustrating the apparatus of the present invention in a subsequently actuated condition;

FIGURE 4 is an enlarged view illustrating in greater detail the dispensing orifice and valve construction; and FIGURE 5 is a fragmentary schematic view similar to FIGURE 1, showing a modified form of apparatus.

FIGURE 6 is a fragmentary diagrammatic view of a modified form of the invention.

In FIGURES 1, 2, and 3, reference numeral 10 refers generally to a combination extrusion and plasticizing apparatus including a tubular housing 11 surrounding an interior plasticizing chamber 12 adapted to receive raw thermoplastic material 13 from a supply hopper 14 or the like. Extending axially through the chamber 12 is an elongated plasticizing and extruding screw 15 having a peripheral helical thread 16 and an interior axial bore 17. The screw 15 is driven by suitable means, such as a motor 18 driving a spur gear 19 or the like meshing with threads 20 formed of one extremity of the screw and exteriorly of the chamber 12.

The extrusion apparatus 10 also includes a frustoconical wall 21 defining the restricted tapering outlet 22 from the chamber 12 merging with a conduit 23 leading to a tubular extrusion chamber 24 defined by an exterior peripheral wall 25 radially spaced from and surrounding a fixed core 26. The core 26 is tapered at its upper end, as at 27, and cooperates with an orifice block 28 superimposed on the peripheral wall 25 to define an annular extrusion orifice 30. Adapted to be positioned immediately over the extrusion orifice 30 for full communication therewith is a separable neck or finish mold 31 mounted upon the actuating rod 32 with a double acting fluid pressure cylinder 33 for movement from its position of FIGURE 1 in which it abuts the orifice plate 28 to the elevated position of FIGURE 3.

Interposed between the orifice 30 and the outlet 22 of the chamber 12, and specifically located in the conduit 23, is a rotary cut-off valve body 35 having a diametric flow passage 35a of substantially the same diameter as the conduit 23, the valve body being rotatable from its position of FIGURE 1 to its position of FIGURE 3 to interrupt the flow of plastic material from the plasticizing chamber 12 to the orifice 30. This valve body 35 is adapted for actuation by suitable means, as by the actuating rod of a fluid pressure actuated cylinder 36 as will be hereinafter described in detail in connection with FIGURES 4 and 5.

Slidably disposed in the axial bore 17 of the plasticizing screw 15 is an elongated piston indicated generally at 40, this piston being actuatable by a fluid pressure actuated cylinder 41 for reciprocatory motion throughout a stroke illustrated in one extreme position of FIGURE 1 and illustrated in the other extreme position in FIGURE 3.

It will be noted that the screw 15 is provided with a plurality of radially extending ports 42 establishing communication between the bore 17 and those portions of the plasticizing chamber 12 intermediate the screw 15 and the housing 11 when the piston is in its retracted position of FIGURE 1. Such communication is interrupted when the piston occupies its positions of either FIGURE 2 or 3.

The cylinder 41 is single acting, that is, the cylinder is effective to displace the piston 40 under pressure only to the left, inasmuch as the left-hand end of the piston 41 is vented to a sump 43 through drain line 44. The right-hand end of the cylinder 41 is vented to a source of pressure, such as the pump 45 through a conduit 46, actuating valve 47, conduits 48 and 49, flow control valve 50, and conduit 51.

It will be noted that the conduits 49 and 51 are connected in parallel at a plurality of points, as through the flow control valve 50, a check valve 52, and a flow restrictor 53. Flow control valve 50 is laterally displaceable under the control of an actuating solenoid 55, which is effective to position a flow passage 56 to interconnect lines 49 and 51, and a compression spring 57 which is effective normally to position a blocking portion of the valve intermediate the lines 49 and 51. The solenoid 55 is incorporated in a control circuit hereinafter described in greater detail.

Valve 47 comprises a laterally shiftable valve element having a flow passage 61 interconnecting conduits 46 and 48 upon actuation of a first solenoid 62 and a drain passage 63 interconnecting conduit 48 in a drain conduit 64 leading to the sump 43 when a second solenoid 65 is energized. These solenoids 62 and 65 are alternatively actuatable and form parts of the control circuit hereinafter described.

The rotation of valve body 35 from its open position of FIGURE 1 to its closed position of FIGURE 3 is effected by the hydraulic cylinder 36 through a rack and pinion connection best shown in FIGURES 4 and 5. Pinion 110 is coaxial with and corotatable with the valve body 35. The actuating rod 111 of cylinder 36 is formed with a series of axially spaced teeth 112, so that the rod 111 serves as a reciprocable rack to actuate the valve 35 to its open position when the rod 111 is retracted (FIGURES 1, 2, and 4) and to close the valve 35 when the rod is extended (FIGURE 3).

To actuate the piston rod 111, the cylinder 36 is double-acting, having its actuation controlled through actuating valve 115. The valve body 116 is illustrated in its retraction position in FIGURES 1 and 2, valve body passage 117, connecting cylinder conduit 118 with pump output line 46 through conduit 119. The extension side of cylinder 36 is vented through line 120, valve passage 121 and line 122 to the sump drain line 64. The position of valve body 116 is controlled by solenoids 125 and 126, solenoid 125 being actuated to position the valve as shown in FIGURES 1 and 2.

To extend the piston rod 111, thereby closing valve 35, solenoid 126 is actuated to connect conduit 118 with line 119 via valve passage 127 and to connect conduit 120 with line 122 via valve passage 128.

Since the operation of valve 115 has been described in detail, it is not necessary to describe the substantially identical valve 33a which actuates the neck mold 31 from its down position of FIGURE 1 to its up position of FIGURE 3 and return. This valve is solenoid operated through lead lines 33b from a timer 130. Similar valves 101a are operated from timer 130 to actuate cylinders 101 for blow molds 100.

The electrical control circuit comprises a pair of main leads 70 and 71 connected to a source of suitable current, preferably direct current. The line 70 is under the control of a timer switch 72, the actuating solenoid 73 of which is controlled by a timing device 74, either electrical or mechanical, and which is effective to open and close the switch 72 in proper timed sequence. This timing device 74, although separately shown, actually forms a part of the overall timer 130, being connected thereto by lead lines 74a. The line 70 is connected to a central movable switch contact 75 forming a part of a dipole switch mechanism indicated generally at 76 and including fixed, spaced contacts 77 and 78 contactable by the contact 75. This contact 75 is carried by a spring arm 80, the free end of which carries a cam follower 81 contacting the periphery of a cam 82 having a series of recesses numbered 1, 2 and 3 in consecutive clockwise positions thereabout. When the cam follower 81 is in either cam position 1 or cam position 3, the contacts 75 and 77 are closed, as illustrated in FIGURE 1 of the drawings. When the cam follower 81 is in the recessed cam position 2, the contacts 75 and 78 are closed, as illustrated in FIGURES 2 and 3.

The cam 82 is rotatable in counter-clockwise direction upon a shaft 83 which is common to the cam 82 and to an actuating ratchet 85. This ratchet is adapted to be actuated in a counter-clockwise direction and in stepwise fashion by a vertical latch pawl 86 mounted at the end of a ratchet actuating arm 87 which actually forms the armature of a solenoid assembly including a core 88 and a solenoid winding 89. The arm 87 is pivotal about a fulcrum 90 and is normally urged in a clockwise direction by a tension spring 91. Upon actuation of the solenoid winding 89, the armature 87 is pulled downwardly, thereby depressing the pawl 86 and rotating the ratchet 85 in a counter-clockwise direction.

It will be noted that a plurality of limit switches LS1, LS2, and LS3 are connected in parallel to the solenoid winding 89 through line 92, so that the actuation of any one of the solenoids by the piston 40 will actuate the solenoid winding 89, depress the ratchet arm 87 and actuate the ratchet wheel 85 in stepwise, counter-clockwise fashion. Such actuation of the ratchet wheel 85 will result in rotation of the cam 82 sequentially and close the contacts 75—77 or 75—78 depending upon the rotative position of the cam.

OPERATION

The operation of the device is summarized in Table I in which the instantaneous cam position is noted and correlated with the position of the ram, the condition of valve 35, the method step performed, the limit switch actuated, and the timer condition.

Table I

| Cam Position | Valve Position | Position of Ram | Method Step Performed | Limit Switch Actuated | Timer Switch Condition |
|---|---|---|---|---|---|
| 1 | Open | Rear | Injection of Finish. | LS1 | Closed. |
| 2 | Closed | Center | Ram Retraction under Extruder Pressure. | LS2 | Do. |
| 3 | Open | Rear | Extrusion of Tubular Extension. | LS1 | Do. |
| 1 | ---do--- | Center | | LS2 | Do. |
| 2 | Closed | Forward | Ram Retraction Under Extruder Pressure. | LS3 | Do. |
| 3 | ---do--- | Center | | LS2 | Open. |
| 1 | Closed | Rear | Recirculation. | LS1 | Do. |
| 1 | Open | ---do--- | Start of New Cycle. | LS1 | Closed. |

More specifically, reference is made to FIGURE 1 of the drawings, wherein it will be seen that the timer switch 72 is closed, the cam 82 has been rotated to such position that the follower 81 lies at cam position 1, the contacts 75 and 77 are closed, the piston 40 is fully retracted to uncover the radial ports 42 of the extruder screw 15 and the neck mold 31 has been lowered to its position immediately overlying the extrusion orifice 30. The apparatus is now in condition for operation.

The flow of current through the contacts 75, 77 will energize solenoids 55 and 62 to position valve elements 58 and 60 in their positions illustrated in FIGURE 1 of the drawings. At this time, the output of the pump 45 will pass through the actuating valve 47 and the lines 48 and 49. Flow control valve body 58 has been positioned to accommodate flow through the passage 56 thereof so that substantially full flow of the pump 45 passes through line 51 to the rear of the cylinder 41. Of course, some additional flow will occur through the restrictor 53, but such flow will be negligible because of the pressure drop across the restrictor, and the easier path of flow afforded through the passage 56.

Also, solenoid 125 will be actuated to open valve 35.

Forward movement of the piston 40 will accommodate spring return of the limit switch LS1 to its non-actuated position, thereby de-activating the solenoid winding 89 and accommodating elevation of the armature 87 by the spring 91.

Initial forward movement of the piston 40 will close off the radial recirculation passages 42 and subsequent forward movement of the piston will force plastic material through the passage 22, the extrusion chamber 24 and the orifice 30 into the neck mold 31. The piston rod 111 has been earlier retracted to open valve 35, thus accommodating the passage of plastic material for the injection molding of the neck mold 31. Of course, the opening movement of the valve body 35 would have accommodated the flow of plastic material from the extruder screw 15 to the neck mold, but the pressure from the extruder has been supplemented by movement of the piston 40, and the actual injection occurs under the higher pressure generated by the movement of the piston 40.

The piston 40 moves forwardly until it actuates the second limit switch, LS2, resulting in energization of the winding 89, the depression of the solenoid armature 87 against the tension spring 91 and the counterclockwise stepped movement of the ratchet wheel 85. Such movement of the ratchet wheel 85 will rotate the shaft 83 in a counterclockwise direction and will result in movement of the cam wheel 82 to its position at which cam recess No. 2 underlies the cam follower 81. The spring arm 80 will accordingly be depressed and contacts 75 and 78 will be closed and contacts 75, 77 will be opened. The opening of the contacts 75, 77 de-energizes the solenoids 55, 62, and 125, and the closure of the contacts 75, 78 energizes the solenoids 65 and 126.

The spring 57 will actuate the flow control valve body 58 to the right, shutting off communication between lines 49 and 51, and actuation of the solenoid 65 will move the actuating valve body 60 to the left interconnecting lines 48 and 64 through the drain passage 63. At this time, the right-hand end of the cylinder 41 will be connected with the sump 43 through line 51, flow restrictor 52, line 48, drain passage 63 of valve body 60 and line 64.

Consequently, additional pressure built up within the closed plastic body defined by the plastic in the extruder, the passage 22 and confined by the valve 35 will move the piston 40 to the right, inasmuch as there is no pressure on the right-hand side of the cylinder 41, and the right-hand side of the cylinder 41 is connected to the sump through the flow restrictor 53 and the valve body 60. During this return movement, the presence of the flow restrictor 53 will retard the movement of the piston and the extent of restriction by the restrictor 53 will determine the pressure and the time necessary to return the piston 40 to its retracted position of FIGURE 1.

The piston returns to the right until such time as limit switch 1 is again actuated. Actuation of the limit switch 1 will again energize the winding 89, pull down the armature 87 and advance the ratchet wheel 85 to its next successive counter-clockwise position and position the cam follower upon the cam portion 3. The cam position 3 is of the same height as cam position 1, thereby re-establishing contact between contacts 75 and 77 and re-energizing the solenoids 62 and 125, and de-energizing the solenoids 65 and 126. Solenoid 55 is not energized at this time because of the timer interposed in its actuating circuit. Thus, fluid energizing the cylinder 41 is metered through the restrictor 53 to advance the piston 40 to the left more slowly through its extrusion-supplementing stroke.

Consequently, the pressure fluid will again pass through lines 48 and 51 to the right-hand side of the cylinder 41 and the piston 40 will be advanced to the left. At the same time, valve 35 will be open. The advancement of piston 40 continues and valve 35 stays open through actuation of limit switch 2, inasmuch as actuation of the limit switch LS2 will merely re-energize the winding 89, depress the armature 87, and rotate the ratchet wheel and the cam 82 to the next successive counter-clockwise position, namely, cam position 1 which does not alter the position of the cam follower 81 and which does break the contact between electrical contacts 75 and 77. Thus, the movement of the piston to the left will continue until the position of FIGURE 3 is attained, where limit switch LS3 is actuated. During this movement of the piston 40 to the left to the position of FIGURE 3, the plastic material within the extrusion chamber 24 is expressed upwardly through the orifice 30 as the neck mold 31 is elevated, thereby forming a tubular extension integral with the material filling the neck mold and positioning the extension for enclosure within the separable blow molds.

At this time, the left-hand movement of the piston 40 is complete, the piston occupying a position completely filling the bore 17 of the extruder screw 15. Actuation of limit switch LS3 energizes the solenoid winding 89, depresses the armature 87, moves the cam 82 to its next successive clockwise position, namely, cam position 2, and again brings about electrical contact between contacts 75 and 78, thereby de-energizing solenoid windings 62 and 125 and energizing solenoid windings 65 and 126, thus positioning the valve elements 58, 60 and 116 in their positions illustrated in FIGURE 3 of the drawings.

After the position of FIGURE 3 is attained, the timer 74 is actuated to open timer switch 72. Valves 47, 58 and 116 remain in their positions of FIGURE 3. Inasmuch as there is no pressure at the right-hand side of the cylinder 41, pressure developed as a consequence of continued rotation of the extruder screw 16 expresses material into the chamber 22 building up pressure therein and acting upon the piston 40 to displace it to the right with the actuating fluid returning to the sump through the flow restrictor 53 and line 48, during passage 63 and line 64.

After the extrusion has been completed, as in FIGURE 3, the valves 101a are timer actuated to close the blow molds 100 on the tubular extension and the extension is blow molded to its complete form.

During consequent return movement of the piston, the limit switch LS2 is again actuated, to energize the winding 89, pull down the armature 87 and rotate the ratchet wheel 85 and the cam 82 to the next successive position, namely, position 3. Although the contacts 75 and 77 are closed at this time, the solenoids 55, 62 and 125 are not re-energized because of opening of the timer switch 72. Consequently, the spring 57 maintains the valve 58 in its right-hand position, and the valve bodies 60 and 116 remain in their left-hand illustrated positions of FIGURE 3 because of the prior actuation of the solenoid 62. Upon continued retraction of the piston 40, the limit switch LS1 is actuated when the piston achieves its furthest right-hand position, namely, the position illustrated in FIGURE 1 of the drawings, the cam is actuated to its next successive position, namely, position 1 upon energization of the windings 89, and the valves remain in their position of FIGURE 3. Accordingly, the apparatus is set for the next successive operation following closure of the timer switch 72.

During this at rest position with the valve element 35 in its illustrated position of FIGURE 3, plasticized material advanced to the left by the screw 16 will be recirculated through the left-hand end of the bore 17 and the radial passages 42 to maintain the material plasticized and in condition for the next successive operation.

An alternative actuation arrangement for valve 115 is illustrated in FIGURE 5. Here, the valve 35 is actuated by the cylinder 36 under the control of a valve 116a urged to a valve-closing position by a spring 126a and to a valve-opening position by a solenoid 125a energized by the timer lead lines 74a. Thus, at any time that the timer 74 is actuated, the valve 35 is open. When the timer 74 is not actuated, the valve 35 is closed.

Therefore, the valve 35 may be closed during the interval between injection molding in the mold 31 and the extrusion of the tube (by the apparatus of FIGURES 1–3, inclusive) or the valve may remain open (by the apparatus of FIGURE 5). In either event recirculation may occur, the piston 40 being retracted by the back pressure of plastic material against the closed valve in one instance and against the mold-confined plastic column in the other.

In the modified form of the apparatus of FIGURE 6, an external recirculation-controlling and extruder-supplementing piston 40a is utilized.

This piston 40a is reciprocable in a recirculation passage 17a communicating with the passage 22 through passage 17a and communicating with the periphery of the screw 15 through passage 17b. The piston 40a is actuated by a fluid pressure cylinder 41a identical with the cylinder 41 of FIGURE 1. The control system and other portions of the apparatus of the embodiment of FIGURE 6 are identical with those of FIGURE 1 and identical reference numerals are applied thereto.

All in all, the operation of the embodiment of claim 6 is the same as the operation of the embodiment of FIGURES 1 through 5. The only material difference is structural and involves the utilization of an external recirculation passage and the disposition of the supplementing piston 40a externally of the screw 15.

While preferred embodiments have been described in detail above, it will be understood that numerous modifications might be resorted to without departing from the scope of the invention as defined in the following claims.

We claim:

1. In a method of making intermittently a succession of plastic articles utilizing a plasticizer-extruder having an axially fixed continuously rotatable screw for constantly discharging plasticized material to a conduit communicable with a discharge orifice, the steps of intermittently establishing communication between said conduit and said orifice to issue material through the orifice, interrupting said communication between said issues of material, accumulating a predetermined body of material discharged by said screw when said communication is interrupted, and concurrently discharging into said conduit material from both said screw and the accumulated body whenever said communication is established.

2. In an intermittently operable extrusion mechanism, means defining a conduit terminating in an orifice, a plasticizer including a tubular housing and an axially fixed continuously rotatable screw in said housing having an outlet constantly communicating with said conduit means, means defining an elongated accumulation chamber opening at one end into the conduit means and communicating at the other end with a portion of the screw periphery, a piston reciprocable in said chamber and moved to the other end of the chamber by plasticized material advanced by the screw to establish chamber periphery communication of material filling the recess, power means for moving the piston from said other end of the chamber to said one end thereof, such piston movement expressing into said conduit the material filling the chamber after the interruption of chamber-periphery communication, a valve in said conduit for shutting off screw-orifice and chamber-orifice communication, and means for opening said valve prior to piston actuation, movement of said piston supplementing extruder screw output whenever said valve is open.

3. A mechanism as defined in claim 2, further characterized by said chamber being an axial recess in said screw and screw-recess communication being established through a radial port in said screw.

4. A mechanism as defined in claim 2, further characterized by said chamber being defined by a conduit external to said plasticizer and screw-chamber communication being established through a housing aperture.

5. In a method of making a number of successive individual plastic articles at least partially injection molded from solid plastic material supplied to a housing to be advanced therethrough by a continuously rotating extruder screw at a normal extruder output pressure, the exit end of the screw communicating with an orifice, the solid material being rendered fluid during its passage intermediate the housing and the exterior periphery of the screw therein, the steps of interrupting communication between the screw exit end and the orifice, accumulating at the normal output pressure of the extruder that material advanced peripherally of the screw during such interruption, recirculating excess accumulated material to that exterior peripheral portion of the screw at which the material in the housing is fluid, and substantially simultaneously (a) interrupting recirculation, (b) establishing extruder-orifice communication, and (c) supplying to the orifice at least a portion of the previously accumulated material together with material issuing from said extruder, whereby plasticized material from the extruder is supplemented by the accumulated material and supplied to the orifice at an injection molding pressure different from the normal output pressure of the screw.

6. In a method as defined in claim 5 wherein the method includes a later extrusion operation as well as an initial injection molding operation, the additional steps of repeating the steps (a), (b) and (c) during the extrusion operation to supplement the extruder output during extrusion as well as during injection molding.

7. In a method of making a plastic article from plasticized material issued from a plasticizer communicating with a conduit leading to an orifice, plasticizer-orifice communication being controlled by valve means in the conduit, the steps of accumulating in communication with said conduit a body of plasticized material during those periods when the valve means prevents plasticizer-orifice communication, and expressing into said conduit material from said accumulated body to supplement the material simultaneously issued into said conduit from said plasticizer whenever said valve means establishes plasticizer-orifice communication.

8. In a method of making successive plastic articles by cyclically repeated injection molding and extrusion operations utilizing plasticized material issuing from a plasticizer into a conduit leading to an orifice, the steps of initially accumulating in communication with said conduit a predetermined volume of plasticized material issued by said plasticizer, expressing into said conduit a portion only of the accumulated material to supplement the material simultaneously issued by said plasticizer during the injection molding operation, reaccumulating the predetermined volume of said material during the interval between the injection molding operation and the next successive extrusion operation, expressing into said conduit substantially all of the accumulated material to supplement the material simultaneously issued by said plasticizer into said conduit during the extrusion operation, and re-accumulating plasticized material to said predetermined volume during the interval between successive operating cycles.

9. In a method of intermittently injection molding plastic material, wherein plasticized material is continuously issued from a plasticizer at a normal output pressure and wherein a body of such plasticized material is accumulated intermediate successive molding operations performed at a dispensing orifice, the steps of positioning an injection mold at the dispensing orifice and filling the injection mold with material simultaneously issued from the accumulated body of plasticized material and from the plasticizer, the injection mold being filled at a pressure different from the normal output pressure of said plasticizer.

References Cited in the file of this patent

UNITED STATES PATENTS

| | | |
|---|---|---|
| 2,668,986 | Miler | Feb. 16, 1954 |
| 2,871,516 | Sherman et al. | Feb. 3, 1959 |
| 2,881,477 | Friulzi | Apr. 14, 1959 |
| 2,944,288 | Sherman | July 12, 1960 |